United States Patent [19]

Baumgartner et al.

[11] Patent Number: 5,387,650
[45] Date of Patent: *Feb. 7, 1995

[54] PREPARATION OF ABS MOLDING MATERIALS

[75] Inventors: Ehrenfried Baumgartner, Roedersheim-Gronau; Juergen Hofmann, Ludwigshafen; Rudolf H. Jung, Worms; Rainer Moors, Limburgerhof; Hansjoerg Schaech, Ludwigshafen, all of Germany

[73] Assignee: BASF Aktiengesellschaft, Ludwigshafen, Germany

[*] Notice: The portion of the term of this patent subsequent to Jan. 11, 2011 has been disclaimed.

[21] Appl. No.: 179,822

[22] Filed: Jan. 11, 1994

Related U.S. Application Data

[63] Continuation of Ser. No. 764,859, Sep. 24, 1991, abandoned.

[30] Foreign Application Priority Data

Sep. 27, 1990 [DE] Germany .............................. 4030512

[51] Int. Cl.$^6$ ..................... C08F 279/04; C08F 2/38
[52] U.S. Cl. ..................... 525/316; 525/52; 525/53
[58] Field of Search ..................... 525/52, 53, 316

[56] References Cited

U.S. PATENT DOCUMENTS

| | | |
|---|---|---|
| 3,243,481 | 3/1966 | Ruffing et al. . |
| 3,624,185 | 11/1971 | Lederer et al. ..................... 525/316 |
| 4,042,647 | 8/1977 | Cornell . |
| 4,252,911 | 2/1981 | Simon . |
| 4,410,659 | 10/1983 | Lee et al. . |
| 4,421,895 | 12/1983 | Echte et al. . |
| 4,925,896 | 5/1990 | Matarrese et al. ..................... 525/53 |
| 5,250,611 | 10/1993 | Baumgartner et al. ..................... 525/52 |
| 5,278,253 | 1/1994 | Baumgartner et al. ..................... 525/316 |

FOREIGN PATENT DOCUMENTS

| | | |
|---|---|---|
| 054141 | 6/1982 | European Pat. Off. . |
| 103657 | 3/1984 | European Pat. Off. . |
| 2304645 | 3/1976 | France . |
| 2448596 | 4/1975 | Germany . |
| 3339531 | 5/1984 | Germany . |
| 2128433 | 5/1984 | United Kingdom . |

OTHER PUBLICATIONS

Chem. Abst. JP 63/199 717 Aug. 1988.
Chem. Abst. JP 63/207 804 Aug. 1988.
Chem. Abst. JP 63/207 803 Aug. 1988.
Chem. Abst. JP 54/070 350 Jun. 1979.

Primary Examiner—Vasu S. Jagannathan
Attorney, Agent, or Firm—Keil & Weinkauf

[57] ABSTRACT

A process for the continuous preparation of high-impact polystyrene-acrylonitrile (ABS) by free radical-initiated polymerization of a mixture of from 60 to 90% by weight of at least one vinylaromatic monomer and from 10 to 40% by weight of least one further ethylenically unsaturated monomer, in the presence of from 5 to 30% by weight, based on the sum of the monomers, of polybutadiene having a solution viscosity (5% strength by weight in styrene at 25° C.) from 25 to 95 mPa.s and in the presence or absence of a solvent, in at least three consecutive reactors operated essentially without back-mixing, at from 50° to 170° C., phase inversion taking place in one of the reactors, involves carrying out the polymerization as far as phase inversion at 90° C. or below and initiating the polymerization by free radicals from the decomposition of tert-butyl peresters whose half life period at 90° C. is not more than 20 minutes, the polybutadiene content, based on the total reaction mixture, being at least 10% by weight and at most 25% of the total amount of chain-transfer agent (regulator) required being added up to the time of phase inversion and the remainder being added thereafter.

2 Claims, No Drawings

PREPARATION OF ABS MOLDING MATERIALS

This application is a continuation of application Ser. No. 07/764,859, filed on Sep. 24, 1991 now abandoned.

The present invention relates to a continuous process for the preparation of high-impact polystyrene-acrylonitrile (ABS) whose dispersed rubber particles have diameters of less than 500 nm, by bulk or solution polymerization in at least three reaction zones, namely in consecutive reactors operated essentially without back-mixing, at 50° to 170° C., using a free-radical initiator and possibly a chain-transfer agent (regulator), phase inversion taking place in one of the reactors.

The following publications, for example, relate to continuous processes for the preparation of high-impact, unmodified or acrylonitrile-modified polystyrene:

(1) U.S. Pat. No. 3,243,481
(2) U.S. Pat. No. 4,252,911
(3) EP-A-103 657
(4) DE-A-3 339 531
(5) DE-A-2 448 596
(6) U.S. Pat. No. 4,410,659
(7) EP-A-54 141
(8) JP-A-63/199 717
(9) JP-A-63/207 804
(10) JP-A-63/207 803
(11) JP-A-54/070 350.

(1) and (2) disclose the continuous preparation of ABS polymers, in particular in two or more reaction zones. The preparation is carried out at from 80 to 180° C.; higher temperatures may be used in a subsequent degassing step (removal of the solvent or residual monomer).

Another process for the preparation of ABS polymers is emulsion polymerization, but we will not describe this in greater detail here.

The mechanical properties of ABS molding materials polymerized in bulk or solution on the one hand and prepared in emulsion on the other hand are substantially identical. The advantages of bulk or solution polymers are, in particular, the lower preparation costs (inter alia higher rubber effectiveness, no effluent) and paler inherent color of the product, which consumes less pigment for coloration. However, they have the disadvantage, compared with the result of emulsion polymerization, of lower surface gloss since the bulk- or solution-polymerized ABS contains relatively large dispersed rubber particles. There have therefore been many attempts to overcome this problem by appropriate modifications to the process and thus to prepare ABS by bulk or solution polymerization so that small rubber particles are obtained.

(3) describes a molding material comprising a hard matrix and a soft phase having a rubber particle diameter of less than 1.5 μm. Only rubbers having a solution viscosity (5% strength in styrene) of at least 120 cP are said to be suitable for the claimed products. ABS materials having rubber particles of 0.5 μm or less, which are necessary for a gloss equal to that of emulsion ABS, are not obtained by this process.

(4) indicates that, in a continuous process for the preparation of bulk or solution ABS, inter alia the rubber concentration must be kept below 12% by weight in order to give an ABS containing small rubber particles. However, products containing less than 12% by weight of rubber and having a maximum particle size of 0.5 μm have an industrially unsatisfactory notched impact strength.

(5) describes a bulk suspension polymerization for an ABS polymer for the preparation of mixtures with polyesters. Particle sizes of from 500 to 2000 nm are said to have been achieved for the ABS component. By using high initiator concentrations (cf. Example 1) rubber particles having a diameter of less than 1000 nm are obtained. Apart from the fact that ABS products of this type are not comparable with the molding materials prepared in emulsion (these have, for example, rubber particle diameters of less than 500 nm), this process cannot be used for a continuous solution polymerization since the high reaction rate results, at high conversions, in problems in the reactors.

(6) describes a continuous bulk polymerization in an extruder using large amounts of acrylonitrile, giving ABS products having a rubber particle diameter of from 10 to 500 nm. The large excess of acrylonitrile means that the rubber is as it were precipitated; the rubber particles produced do not have hard matrix inclusions, which results in the abovementioned disadvantages. In addition, polymerization in an extruder is an extremely expensive technology for large-scale industry.

However, the use in (8) of rubber of extremely low solution viscosity in a solution polymerization gives rubber particles having a maximum diameter of 750 nm. However, the surface gloss of an ABS produced in this way cannot compete with that of an ABS produced by emulsion polymerization since the rubber particles are too large. The low molecular weight of the rubber means that the rubber particles obtained are poorly filled with hard matrix, which results in the abovementioned disadvantages.

In (7), a "rubber-like polymer" of low solution viscosity is used as an impact modifier for ABS. In the examples, the "rubber-like polymer" is described as a styrene-butadiene block copolymer. Mean rubber particle sizes of from 500 to 600 nm are obtained. (9) to (11) also describe the use of block rubber to prepare ABS containing small rubber particles. However, the high price of the block rubber, which negates the cost advantage of the bulk or solution polymerization process, is disadvantageous.

It is an object of the present invention to provide a process which, using polybutadiene and even in continuous bulk or solution polymerization processes, gives a high-gloss ABS containing small rubber particles, i.e. having a diameter of less than 500 nm.

We have found that this object is achieved by dividing the polymerization into a plurality of consecutive reaction zones operating essentially without back-mixing (i.e. as tubular reactors), in each of which certain, narrowly defined operating conditions prevail.

The present invention accordingly provides a process, of the type indicated in the first paragraph, for the continuous preparation of high-impact polystyrene-acrylonitrile (ABS) by free radical-initiated polymerization of a mixture of from 60 to 90% by weight of at least one vinylaromatic monomer and from 10 to 40% by weight of at least one further ethylenically unsaturated monomer, in the presence of from 5 to 30% by weight, based on the sum of the monomers, of polybutadiene having a solution viscosity (5% strength by weight in styrene at 25° C.) of from 25 to 95 mPa.s and in the presence or absence of a solvent, in particular ethylbenzene, in at least three consecutive reactors operated essentially without back-mixing, at from 50° to 170° C., phase inversion taking place in one of the reactors, which comprises carrying out the polymerization as far as phase inversion at 90° C. or below and initiating the polymerization by free radicals from the decomposition of tert-butyl peresters whose half life period at 90° C. is not more than 20 minutes, the polybutadiene content, based on the total reaction mixture, being at least 10% by weight and at most 25% of the total amount of chain-transfer agent (regulator) required being added up to the time of phase inversion and the remainder being added thereafter.

Suitable monomers for the process are styrene and acrylonitrile in a ratio of from 90:10 to 60:40. Equivalent monomers, such as α-methylstyrene, o-, m- and p-methylstyrene, tert-butylstyrene and methacrylonitrile can be used in a conventional manner instead of or together with styrene or acrylonitrile respectively.

For clarity and simplicity, styrene, acrylonitrile and polybutadiene hereinafter generally also include their equivalents; to this extent, the invention is not restricted.

A particularly suitable rubber is medium- or high-cis polybutadiene having a molecular weight of from 70,000 to 350,000 (weight average). However, it is in principle also possible to use block rubbers, e.g. of the styrene-butadiene type, in the process. The rubber is preferably employed in an amount of from 3 to 30% by weight, based on the monomers.

Suitable free-radical initiators are graft-active peroxides. Particular preference is given to initiators which produce tert-butyloxy free radicals. Of particular importance are tert-butyl peresters having a decomposition rate of $t_{\frac{1}{2}} \leq 20$ minutes at 90° C., e.g. tert-butyl perneodecanoate and/or tert-butyl perpivalate. Said tert-butyl peresters are metered separately into each of the first two reaction towers. The same initiator or two different initiators can be used in towers 1 and 2. The initiators are in each case employed in an amount of from 0.01 to 0.5% by weight, based on the monomers.

Suitable chain-transfer agents (regulators) are the conventional mercaptans having from 4 to 18 carbon atoms. n-Butyl mercaptan, n-octyl mercaptan and n- and t-dodecyl mercaptan have proven particularly successful. The amount of mercaptan, if used, is generally from 0.01 to 0.3% by weight, based on the monomers.

If the polymerization is carried out in solution, a suitable solvent is toluene, xylene, methyl ethyl ketone or tetrahydrofuran and in particular ethylbenzene, used in an amount of up to 25% by weight, based on the monomers.

A particularly suitable rubber is polybutadiene, for example of the medium- or high-cis type having a molecular weight in the range from 70,000 to 350,000 (weight average). The rubber is employed in an amount of, preferably, from 10 to 30% by weight, based on the monomers.

The process according to the invention is carried out in at least 3 reaction zones, i.e. in separately operated reactors; preference is given to a reactor cascade comprising 4 reaction zones. Preferred reaction zones are stirred polymerization towers with internal cooling tubes. In the terminology of process engineering, these reaction zones or towers each correspond to a tubular reactor; they behave approximately so that an essentially back-mixing-free grafting flow can be assumed.

In the first reaction zone, the polybutadiene is grafted with styrene and acrylonitrile, i.e. up to about 0.7 times the amount of polybutadiene employed is polymerised (7% of polystyrene-acrylonitrile at a solution concentration of 10% of polybutadiene, based on the monomers). In the first reaction zone, the polymerization is initiated using tert-butyl peresters ($t_{\frac{1}{2}} \leq 20$ minutes at 90° C.).

The phase inversion takes place in the second polymerization tower, i.e. the polymerization is continued with stirring until the solids content is at least twice the amount of polybutadiene employed, so that completion of the phase inversion is ensured. The polymerization is likewise carried out isothermally at $\leq 90°$ C. using tert-butyl peresters which easily decompose as initiators ($t_{\frac{1}{2}} \leq 20$ minutes at 90° C.). A maximum of 25% by weight of the total amount of regulator, e.g. mercaptan, required to set the molecular weight is added in the zone of phase inversion. The remainder of the regulator can be metered into the downstream reaction towers 3 and/or 4.

In polymerization towers 3 and 4, the thermal polymerization of the polystyrene-acrylonitrile matrix is carried out to a solids content of at least 50% by weight, but preferably at least 65% by weight. After the fourth polymerization tower, the polymer melt is degassed, cooled and granulated.

During the polymerization, in particular after the rubber solution has been prepared or before the high-impact polymers obtained by the process according to the invention have been processed, conventional additives, such as internal glidants, antioxidants or UV stabilizers, and lubricants, fillers and the like can be added to the reaction batch in conventional amounts, known to a person skilled in the art.

The advantage of the process according to the invention is that a high degree of grafting of the rubber and a high graft yield are achieved without problems of heat dissipation, reactor deposits or premature crosslinking occurring. This gives small rubber particles (i.e. those having diameters of less than 500 nm) and thus an ABS which, in suitable molds, produces high surface gloss. A further advantage is that products of high impact strength or good translucency can be prepared in a targeted manner, depending on the way the reaction is carried out, using one and the same rubber.

The molding materials obtained by the process according to the invention can be subjected to conventional thermoplastic processing, i.e. by extrusion, injection molding, calendering, blow molding, compression molding or sintering; moldings are preferably produced by injection molding.

The material properties used in the examples and comparative experiments below were determined as follows:

The solution viscosity, SV, of the rubber is measured in a 5% strength by weight solution in styrene at 25° C.

The mean particle size is determined by evaluating electron photomicrographs.

The notched impact strength is measured in accordance with DIN 53 453 on moldings injection-molded at 230° C.

The surface gloss was measured on the side faces of injection-molded test boxes using a Dr. Lange laboratory reflectometer in accordance with DIN 67 530, apart from the measurement angle, which was set at 55.8°. The test boxes are 11 cm in length, 4.3 cm in width and 5 cm in height and weigh about 26–27 g. The injection-molding conditions for the production of the test boxes are given in the examples.

The amounts given are generally by weight.

EXAMPLES 1 TO 4

A suitable polymerization plant comprises a 250 rubber dissolution tank, a 250 l storage tank, four 30 l series-connected tower reactors (height=1100 mm, diameter=220 mm) with internal parallel cooling tubes arranged in a plurality of horizontal planes and a stirrer operating between the cooling tube planes, and a downstream degassing and granulation apparatus.

18 kg of commercially available rubber (Buna HX 500 from Bayer AG, having a solution viscosity of 90 mPa.s as a 5% strength solution in styrene at 25° C.) are dissolved in 22.5 kg of ethylbenzene, 82.1 kg of styrene and 27.4 kg of acrylonitrile with stirring over the course of 5 hours. The solution is pumped into the storage tank, from where the polymerization plant is supplied continuously with rubber solution. 20 l of rubber solution per hour are pumped into the polymerization plant. In the first two polymerization towers, the polymerization is initiated at 80° C. by introducing continuously 2.1 g/h of tert-butyl perpivalate into the first tower and 4.2 g/h into the second tower. In the first tower, the polymerization is continued to a solids content of 18% by weight, and in the second tower to a solids content of 28% by weight. The stirrer speed is kept at 150 rpm in both towers. In this way, the rubber is grafted in the first tower, while the phase inversion takes place in the second tower. The process conditions in the first two reaction zones are crucial for determining the rubber particle morphology in the PSAN matrix.

In the subsequent reaction zones, the PSAN matrix is formed by thermal polymerization. In the third polymerization tower, a solids content of 45% by weight is produced at 130° C. and a stirrer speed of 50 rpm. In the fourth polymerization tower, a solids content of 70% by weight is obtained by polymerization at 146° C. with stirring at 10 rpm. All the towers are operated to capacity. tert-Dodecyl mercaptan is additionally metered continuously into the second and third towers as molecular weight regulator. Table 1 shows the effect of the amount of regulator added on the formation of small rubber particles.

After leaving the fourth polymerization tower, the polymer melt is degassed, cooled and granulated. The throughput of solid was 14 kg/h.

TABLE 1

| Example | Amount of regulator metered in (tert-dodecyl mercaptan) | | | | Viscosity index of the matrix [ml/g] | Rubber particle size [nm] | Surface* gloss | | Notched impact strength | |
| --- | --- | --- | --- | --- | --- | --- | --- | --- | --- | --- |
| | Tower 1 [g/h] | Tower 2 [g/h] | Tower 3 [g/h] | Tower 4 [g/h] | | | Cond. 1 [%] | Cond. 2 [%] | 23° C. [kJ/m²] | −40° C. [kJ/m²] |
| 1 | — | — | 60 | — | 83 | 300 | 70 | 46 | 6 | 5 |
| 2 | — | 17 | 17 | — | 77 | 350 | 68 | 42 | 6 | 5 |
| 3 | — | 28 | — | — | 80 | 400 | 68 | 37 | 8 | 6 |
| 4 | 5 | 20 | — | — | 81 | 500 | 68 | 35 | 15 | 10 |
| Comparison | 15 | 15 | — | — | 80 | 800 | 60 | 30 | 21 | 14 |
| Comparison | 25 | — | — | — | 80 | 2500 | 54 | 15 | 23 | 14 |

*Condition 1: Material temperature 255° C.
Mold-surface temperature 60° C.
Injection time 0.14 sec
*Condition 2: Material temperature 255° C.
Mold-surface temperature 30° C.
Injection time 0.7 sec The molding materials prepared for comparison purposes no longer satisfy the surface-gloss demands made in industry of injection-molded finished parts.

An ABS prepared by emulsion polymerization and having a comparable rubber content of 17% and a viscosity index of the hard matrix of 80 ml/g has the following surface gloss: condition 1:68%, condition 2:47%.

EXAMPLES 5 TO 8

The procedure was as in Examples 1-4. In each case, the polymerization was carried out using tert-butyl perpivalate as initiator and with addition of regulator into tower 2 (see Example 3). Solids contents in the polymerization towers were set as follows:

| Tower 1 | solids content of 18% by weight |
| --- | --- |
| Tower 2 | solids content of 28% by weight |
| Tower 3 | solids content of 45% by weight |
| Tower 4 | solids content of 70% by weight |

In each case, sufficient tert-dodecyl mercaptan was metered into tower 2 so that the viscosity index of the polystyrene-acrylonitrile matrix remained constant at about 80 ml/g. The reaction temperature was varied in towers 1 and 2.

TABLE 2

| Example | Polymerization temperature | | Rubber particle size [nm] | Surface gloss* | | Notched impact strength | |
| --- | --- | --- | --- | --- | --- | --- | --- |
| | Tower 2 [g/h] | Tower 3 [g/h] | | Cond. 1 [%] | Cond. 2 [%] | 23° C. [kJ/m²] | −40° C. [kJ/m²] |
| 5 | 65 | 60 | 0.4 | 68 | 35 | 8 | 5 |
| 6 | 70 | 70 | 0.4 | 67 | 36 | 8 | 6 |
| 7 | 80 | 80 | 0.4 | 68 | 37 | 8 | 6 |
| 8 | 90 | 90 | 0.5 | 68 | 35 | 14 | 9 |
| Comparison | 90 | 100 | 0.7 | 62 | 32 | 20 | 13 |
| Comparison | 100 | 100 | 0.9 | 57 | 28 | 21 | 14 |

TABLE 2-continued

| Example | Polymerization temperature Tower 2 [g/h] | Polymerization temperature Tower 3 [g/h] | Rubber particle size [nm] | Surface gloss* Cond. 1 [%] | Surface gloss* Cond. 2 [%] | Notched impact strength 23° C. [kJ/m$^2$] | Notched impact strength −40° C. [kJ/m$^2$] |
|---|---|---|---|---|---|---|---|
| Comparison | 100 | 100 | 1.0 | 53 | 25 | 21 | 14 |

*Condition 1: Material temperature 255° C.
Mold-surface temperature 60° C.
Injection time 0.14 sec
*Condition 2: Material temperature 255° C.
Mold-surface temperature 30° C.
Injection time 0.7 sec The molding materials prepared for comparison purposes no longer satisfy the surface-gloss demands made in industry of injection-molded finished parts.

EXAMPLES 9 TO 10

The polymerization was carried out as in Example 3. The initiator required for the polymerization was varied.

TABLE 3

| Example | Initiator | Half life period at 90° C. [min] | Rubber particle size [nm] | Surface gloss* Cond. 1 [%] | Surface gloss* Cond. 2 [%] | Notched impact strength 23° C. [kJ/m$^2$] | Notched impact strength −40° C. [kJ/m$^2$] |
|---|---|---|---|---|---|---|---|
| 9 | TBPND | 3.2 | 0.4 | 69 | 38 | 6 | 4 |
| 10 | TBPPI | 9.1 | 0.4 | 68 | 37 | 8 | 6 |
| Comparison | TBPEH | 58.4 | 0.9 | 56 | 27 | 13 | 9 |
| Comparison | CPND | 1.3 | 1.2 | 52 | 21 | 15 | 8 |
| Comparison | TAPND | 3.2 | 1.1 | 53 | 20 | 14 | 7 |
| Comparison | TAPPI | 7.2 | 1.4 | 50 | 19 | 16 | 8 |
| Comparison | BPO | 76.5 | 1.0 | 52 | 26 | 14 | 10 |

The ABS molding materials prepared for comparison purposes no longer satisfy the surface-gloss demands made in industry of injection-molded finished parts.

The abbreviations for the initiators used have the following meanings:
TBPND=tert-butyl perneodecanoate
TBPPI=tert-butyl perpivalate
TBPEH=tert-butyl perethylhexanoate
CPND=α-cumyl perneodecanoate
TAPND=tert-amyl perneodecanoate
TAPPI=tert-amyl perpivalate
BPO=dibenzoyl peroxide

EXAMPLE 11

The polymerization was carried out as in Example 3, but the Buna HX 500 was replaced by the commercial polybutadienes Buna HX 529 C and Buna HX 565. ABS molding materials having the following properties were obtained.

The ABS molding material prepared for comparison purposes no longer satisfies the surface-gloss demands made in industry of injection-molded finished parts.

We claim:

1. A process for the continuous preparation of high-impact polystyrene-acrylonitrile by free radical-initiated polymerization of a mixture of from 60 to 90% by weight of styrene and from 10 to 40% by weight of acrylonitrile, in the presence of from 5 to 30% by weight, based on the sum of monomers, of polybutadiene having a solution viscosity measured as a 5% strength by weight in styrene at 25° C. of from 25 to 95 mPa.s, of from 0.01 to 0.3% by weight, based on the monomers, of a chain transfer agent selected from the group consisting of mercaptans having from 4 to 18 carbon atoms and in the presence of ethylbenzene as solvent, in at least four consecutive reactors operating essentially without back-mixing, at from 50° to 170° C., phase inversion taking place in the second reactor, which comprises carrying out the polymerization as far as phase inversion at 90° C. or below and initiating the polymerization by free radicals from the decomposition of tert-butyl peresters whose half life period at 90° C. is not more than 20 minutes, the polybutadiene content, based on the total reaction mixture, being at least 10% by weight and at most 25% of the total amount of chain-transfer agent being added to the time of phase inversion and the remainder being added thereafter.

2. A process as claimed in claim 1, wherein the initiator used is tert-butyl perneodecanoate and/or tert-butyl perpivalate.

TABLE 4

| Example | Rubber | Solution viscosity of the rubber [mPa.s] | Rubber particle size [nm] | Surface gloss* Cond. 1 [%] | Surface gloss* Cond. 2 [%] | Notched impact strength 23° C. [kJ/m$^2$] | Notched impact strength −40° C. [kJ/m$^2$] |
|---|---|---|---|---|---|---|---|
| 11 | Buna HX 565 | 42 | 0.3 | 70 | 48 | 9 | 5 |
| Comparison | Buna HX 529 C | 170 | 0.9 | 54 | 26 | 20 | 13 |

* * * * *